US010037734B2

(12) United States Patent
Iguchi et al.

(10) Patent No.: US 10,037,734 B2
(45) Date of Patent: Jul. 31, 2018

(54) DISPLAY APPARATUS AND CONTROL METHOD

(71) Applicant: CANON KABUSHIKI KAISHA, Tokyo (JP)

(72) Inventors: Shota Iguchi, Yokohama (JP); Kazuhiro Inoko, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 67 days.

(21) Appl. No.: 14/563,477

(22) Filed: Dec. 8, 2014

(65) Prior Publication Data

US 2015/0161952 A1 Jun. 11, 2015

(30) Foreign Application Priority Data

Dec. 11, 2013 (JP) ................................ 2013-255673

(51) Int. Cl.
*H04N 9/31* (2006.01)
*G09G 3/34* (2006.01)
*G09G 3/36* (2006.01)

(52) U.S. Cl.
CPC ........... *G09G 3/3406* (2013.01); *G09G 3/342* (2013.01); *G09G 3/36* (2013.01); *G09G 2310/0237* (2013.01); *G09G 2310/0283* (2013.01); *G09G 2320/0233* (2013.01); *G09G 2320/0261* (2013.01)

(58) Field of Classification Search
CPC ........ G09G 3/36; G09G 3/342; G09G 3/3406; G09G 2310/0237; G09G 2310/0283; G09G 2320/0261; G09G 2320/0233; G02F 1/133; G02B 19/00; G03B 21/00; G03B 21/2033; G03B 21/208
See application file for complete search history.

(56) References Cited

U.S. PATENT DOCUMENTS

| | | | | | |
|---|---|---|---|---|---|
| 5,122,870 | A * | 6/1992 | Takeda | H04N 9/312 | 348/751 |
| 9,378,842 | B2 * | 6/2016 | Lee | G11C 19/28 | |
| 2002/0044116 | A1 * | 4/2002 | Tagawa | G09G 3/3406 | 345/87 |
| 2004/0201564 | A1 * | 10/2004 | Sugino | G09G 3/3611 | 345/101 |
| 2004/0263495 | A1 * | 12/2004 | Sugino | G09G 3/3611 | 345/204 |

(Continued)

FOREIGN PATENT DOCUMENTS

| | | | |
|---|---|---|---|
| CN | 1779515 | A | 5/2006 |
| CN | 101140358 | A | 3/2008 |

(Continued)

*Primary Examiner* — Lun-Yi Lao
*Assistant Examiner* — Kelly Hegarty
(74) *Attorney, Agent, or Firm* — Canon U.S.A., Inc. IP Division

(57) ABSTRACT

A display apparatus includes a light unit, a display panel configured to transmit light from the light unit, a setting unit configured to set one of a plurality of modes different in a scanning order of the display panel from each other, and a control unit configured to control the light unit to light each of a plurality of areas of the display panel. According to the mode set by the setting unit, the control unit determines timing when the light unit lights the plurality of areas.

5 Claims, 8 Drawing Sheets

(56) References Cited

U.S. PATENT DOCUMENTS

| | | | | |
|---|---|---|---|---|
| 2005/0078070 | A1* | 4/2005 | An | G09G 3/3666 345/87 |
| 2006/0145978 | A1* | 7/2006 | Takatori | G09G 3/2014 345/87 |
| 2007/0171175 | A1* | 7/2007 | Chiang | G09G 3/3648 345/100 |
| 2007/0279359 | A1* | 12/2007 | Yoshida | G09G 3/2025 345/89 |
| 2008/0042968 | A1* | 2/2008 | Oh | G09G 3/342 345/102 |
| 2008/0088566 | A1* | 4/2008 | Chiang | G09G 3/3406 345/100 |
| 2008/0180385 | A1* | 7/2008 | Yoshida | G09G 3/20 345/102 |
| 2010/0045936 | A1 | 2/2010 | Inoue | |
| 2010/0053218 | A1* | 3/2010 | Risher-Kelly | A61B 5/0002 345/649 |
| 2010/0156964 | A1* | 6/2010 | Masuda | G09G 3/342 345/691 |
| 2010/0295844 | A1* | 11/2010 | Hayashi | G09G 3/2096 345/214 |
| 2011/0254827 | A1* | 10/2011 | Tamura | G09G 3/3648 345/212 |
| 2011/0273367 | A1* | 11/2011 | Cheng | G09G 3/3426 345/102 |
| 2013/0083885 | A1* | 4/2013 | Lee | G11C 19/28 377/69 |
| 2013/0222772 | A1 | 8/2013 | Matsubara | |
| 2014/0267199 | A1* | 9/2014 | Sugimoto | G09G 3/3266 345/204 |

FOREIGN PATENT DOCUMENTS

| | | | |
|---|---|---|---|
| CN | 101196663 | A | 6/2008 |
| JP | H011-287987 | A | 10/1999 |
| JP | 2000-321993 | A | 11/2000 |
| JP | 2001-350426 | A | 12/2001 |
| JP | 2006-154025 | A | 6/2006 |
| JP | 2007-127955 | A | 5/2007 |
| JP | 2007-148444 | A | 6/2007 |
| JP | 2007-206725 | A | 8/2007 |
| JP | 2008-65165 | A | 3/2008 |
| JP | 04137162 | B2 | 8/2008 |
| JP | 2009-116351 | A | 5/2009 |
| JP | 2009-168977 | A | 7/2009 |
| JP | 2010-48903 | A | 3/2010 |
| JP | 2011-22524 | A | 2/2011 |
| JP | 2013-047777 | A | 3/2013 |
| WO | 2012/066654 | A1 | 5/2012 |

* cited by examiner

DISPLAY APPARATUS AND CONTROL METHOD

BACKGROUND OF THE INVENTION

Field of the Invention

The present disclosure generally relates to displays and, more particularly, to a display apparatus and a method for controlling a display apparatus.

Description of the Related Art

Conventionally, a liquid crystal projector using a liquid crystal panel is known as a display apparatus. When a display apparatus using a display panel (a liquid crystal panel) displays a moving image, motion blur occurs, in which the contour of a moving portion is displayed in a blurred manner. Examples of the cause of the motion blur include the response characteristics of the liquid crystal panel. For example, when an $n^{th}$ frame is displayed, it takes time for liquid crystals to change from the state of having the target transmittance, based on image data of an $n-1^{th}$ frame, of the liquid crystal panel to the state of having the target transmittance, based on image data of the next $n^{th}$ frame, of the liquid crystal panel. The liquid crystals are in an unstable state during the period until the proportion of the actual transmittance to the target transmittance of the liquid crystal panel, which is determined based on the image data to be displayed, is equal to or greater than a predetermined value. The light irradiating the liquid crystal panel during this period is visible to a user. This can cause the motion blur.

As a method for reducing such motion blur, Japanese Patent Application Laid-Open No. 2007-148444 discusses a method for, in a liquid crystal display, partially controlling lighting of a light source based on information about the start of scanning a liquid crystal panel and the response characteristics of liquid crystals. Then, the motion blur is removed by the method turning off a part of the light source corresponding to an area of the liquid crystal panel where the proportion of the actual transmittance to the target transmittance of the liquid crystal panel, which is determined based on the image data to be displayed is less than a predetermined value, thereby removing motion blur.

Also in a liquid crystal projector, it is possible to partially control a light source by placing a plurality of light sources so as to correspond to a plurality of divided areas of a liquid crystal panel. However, it is not enough for the liquid crystal projector to merely employ the conventional technique for removing the motion blur in a liquid crystal display. The liquid crystal projector has different display modes, such as a normal projection mode, where the liquid crystal projector is used in a state of being placed on a desk or the like, and a hanging projection mode, where an image is projected with the main body of the liquid crystal projector fixed upside down to a ceiling or the like. Thus, in the case of the liquid crystal projector, it is necessary to take into account the relationship between a scanning direction of the display panel and control of the plurality of light sources in the normal projection mode or the hanging projection mode, which does not exist in the case of a conventional liquid crystal display.

SUMMARY OF THE INVENTION

The present disclosure is directed to a display apparatus capable of, even if a scanning direction of a display panel has been switched, reducing motion blur caused by the response characteristics of the display panel by controlling lighting timing of a light source.

Further features of the present disclosure will become apparent from the following description of exemplary embodiments with reference to the attached drawings.

DESCRIPTION OF THE EMBODIMENTS

Various exemplary embodiments, features, and aspects of the disclosure will be described in detail below with reference to the drawings.

Figure 1:
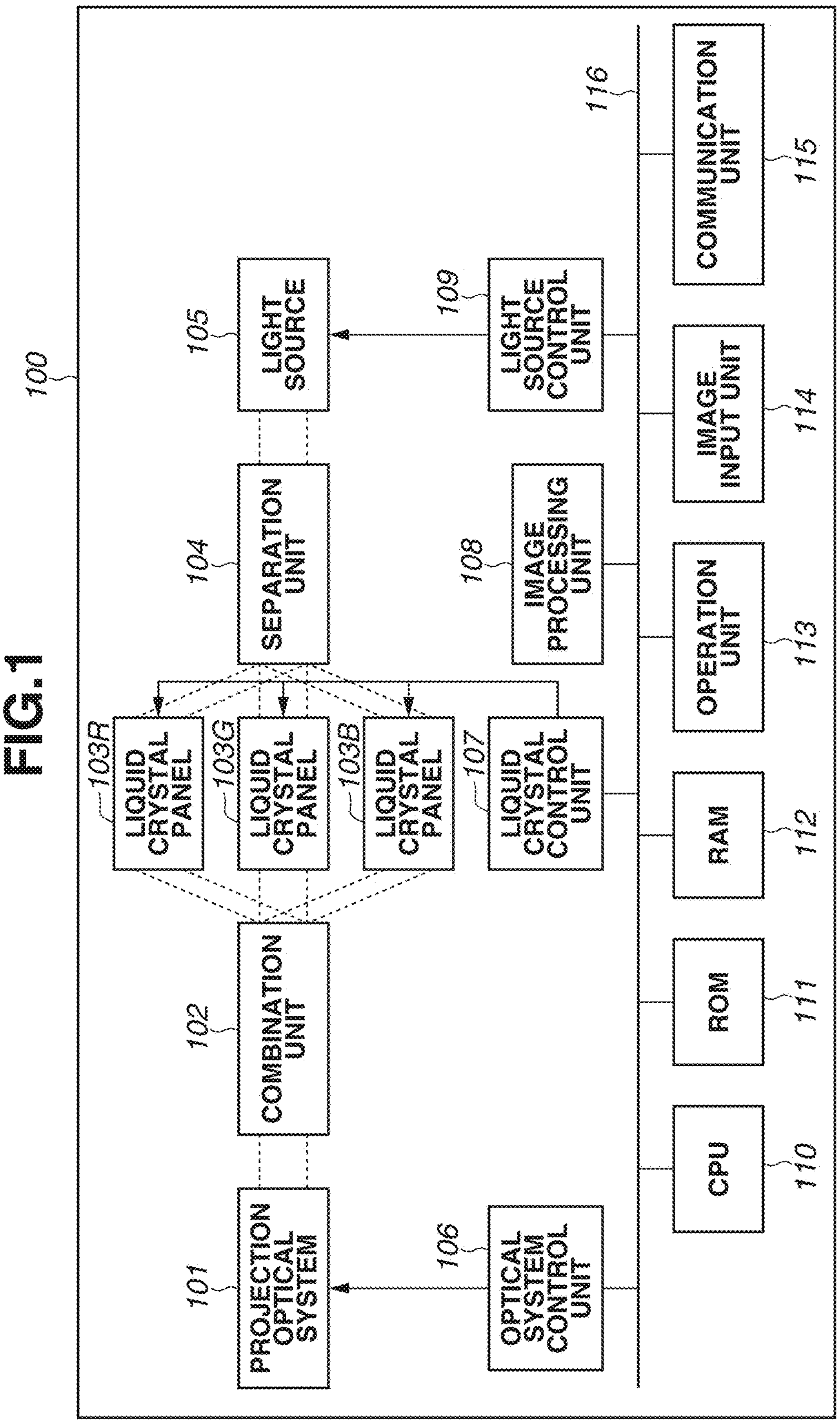
FIG. 1 is a block diagram illustrating an example of a configuration of a liquid crystal display apparatus.

FIG. 1 is a block diagram illustrating an example of a configuration of a liquid crystal display apparatus 100 according to a first exemplary embodiment. The liquid crystal display apparatus 100 includes a projection optical system 101, a combination unit 102, a liquid crystal panel 103, a separation unit 104, and a light source 105. Light output from the light source 105 is separated into red (R), green (G), and blue (B) components of light by the separation unit 104. Then, the red (R), green (G), and blue (B) components of light are incident on liquid crystal panels 103R, 103G, and 103B, respectively. The components of light transmitted through the liquid crystal panels 103R, 103G, and 103B, respectively, are combined together by the combination unit 102. Then, the combined light is projected onto a screen (not illustrated) by the projection optical system 101.

In the present exemplary embodiment, lighting of the light source 105 can be controlled with respect to each of a plurality of divided areas. The lighting of the light source 105 is controlled in a divided manner based on three areas, i.e., an upper area, a middle area, and a lower area for the liquid crystal panel 103. Then, the liquid crystal display apparatus 100 has two display modes including a normal projection mode and a hanging projection mode. The liquid crystal display apparatus 100 differentiates a scanning direction of the liquid crystal panel 103 according to a display mode and changes the order of lighting the three divided areas according to the scanning direction of the liquid crystal panel 103. The motion blur caused by the response characteristics of the liquid crystal panel 103 can be reduced by controlling the lighting timing of the light source 105.

The projection optical system 101 includes a plurality of lenses and an actuator for driving the lenses. The combination unit 102 combines the red (R), green (G), and blue (B) components of light transmitted through the liquid crystal panels 103R, 103G, and 103B, respectively, and includes, for example, a dichroic mirror and a prism. Then, the light obtained by the combination unit 102 combining the red (R), green (G), and blue (B) components is transmitted to the projection optical system 101.

The liquid crystal panel 103R is a liquid crystal device corresponding to a red color and is used to adjust the transmittance of the red (R) component of light among the red (R), green (G), and blue (B) components of light into which the light output from the light source 105 has been separated by the separation unit 104. The liquid crystal panel 103G is a liquid crystal device corresponding to a green color and is used to adjust the transmittance of the green (G) component of light among the red (R), green (G), and blue (B) components of light into which the light output from the light source 105 has been separated by the separation unit 104. The liquid crystal panel 103B is a liquid crystal device corresponding to a blue color and is used to adjust the transmittance of the blue (B) component of light among the red (R), green (G), and blue (B) components of light into which the light output from the light source 105 has been separated by the separation unit 104.

The separation unit 104 separates the light output from the light source 105 into red (R), green (G), and blue (B) components of light, and includes, for example, a dichroic mirror and a prism. The light source 105 outputs light for projecting an image onto the screen (not illustrated), and includes, for example, a halogen lamp, a xenon lamp, a high-pressure mercury lamp, or light-emitting diodes (LEDs). If LEDs corresponding to red (R), green (G), and blue (B) colors are used as the light source 105, the separation unit 104 is unnecessary.

An optical system control unit 106 drives an actuator to adjust positions of the lenses, thereby controlling the projection optical system 101. Thus, the optical system control unit 106 controls enlargement, reduction, and focus adjustment of an image to be projected onto the screen. The optical system control unit 106 includes a microprocessor for controlling the projection optical system 101. A central processing unit (CPU) 110 instead of a dedicated microprocessor may perform processing similar to that of the optical system control unit 106 based on, for example, a program stored in a read-only memory (ROM) 111.

Based on image data processed by an image processing unit 108, a liquid crystal control unit 107 generates a scanning signal for controlling a voltage to be applied to each liquid crystal device in the liquid crystal panels 103R, 103G, and 103B so as to obtain the transmittance of light corresponding to the image data. The liquid crystal control unit 107 scans the liquid crystal panel 103 using the generated scanning signal, thereby adjusting the transmittance of the liquid crystal panel 103. Consequently, if the light obtained by the combination unit 102 combining the components of light transmitted through the liquid crystal panel 103 has been projected onto the screen by the projection optical system 101, an image corresponding to the image data input from the image processing unit 108 is displayed on the screen.

Further, the liquid crystal control unit 107 can change a scanning direction of the liquid crystal panel 103 according to a display mode of the liquid crystal display apparatus 100, which will be described below. The liquid crystal control unit 107 may be configured using a dedicated microprocessor or may be configured so that the CPU 110 performs processing similar to that of the liquid crystal control unit 107 based on a program stored in the ROM 111.

The image processing unit 108 performs processing of changing the number of frames, the number of pixels, and an image shape of an image signal to be displayed and transmits the resulting image signal to the liquid crystal control unit 107. The image processing unit 108 includes, for example, a microprocessor for image processing. The image processing unit 108 can perform functions such as frame thinning processing, frame interpolation processing, resolution conversion processing, and distortion correction processing (keystone correction processing) on the image data to be displayed. The image processing unit 108 performs the above processing on image data input from an image input unit 114 or image data input from a communication unit 115. Further, the image processing unit 108 can also generate image data for an operation screen for controlling the liquid crystal display apparatus 100. The image processing unit 108 may not need to include a dedicated microprocessor, and the CPU 110 may perform processing similar to that of the image processing unit 108 based on, for example, a program stored in the ROM 111.

A light source control unit 109 controls turning on and turning off the light source 105, and controls a light amount of the light source 105. The light source control unit 109 includes a microprocessor for control. In the present exemplary embodiment, the light source control unit 109 can control the lighting of the light source 105 with respect to each of a plurality of areas of the liquid crystal panel 103. Then, the light source control unit 109 can change the order of lighting the plurality of divided areas according to a display mode of the liquid crystal display apparatus 100, which will be described below. The light source control unit 109 may not need to include a dedicated microprocessor, and the CPU 110 may perform processing similar to that of the light source control unit 109 based on, for example, a program stored in the ROM 111.

The CPU 110 controls each operational block of the liquid crystal display apparatus 100. The ROM 111 is used to store a control program describing processing procedures of the CPU 110. Further, a random-access memory (RAM) 112 serves as a work memory to temporarily store the control program and data. The CPU 110 can also temporarily store image data and moving image data input from the image input unit 114 and the communication unit 115, and reproduce an image and a moving image using a program stored in the ROM 111.

An operation unit 113 receives an instruction from a user and transmits a control signal according to the instruction to the CPU 110. The operation unit 113 includes, for example, a switch, a dial, and a touch panel provided on a display unit (not illustrated). Further, for example, the operation unit 113 may transmit a predetermined instruction signal to the CPU 110 based on a signal received by a signal reception unit (e.g., an infrared light reception unit) for receiving a signal from a remote controller. The CPU 110 receives a control signal input from the operation unit 113 or the communication unit 115 and controls each operational block of the liquid crystal display apparatus 100.

The image input unit 114 receives image data from an external apparatus and includes, for example, a composite terminal, a Separate Video (S-Video) terminal, a D-terminal, a component terminal, an analog RGB terminal, a Digital Video Interface-Integrated (DVI-I) terminal, a Digital Video Interface-Digital (DVI-D) terminal, and a High-Definition Multimedia Interface (HDMI) (registered trademark) terminal. Further, if having received an analog image signal, the image input unit 114 converts the received analog image signal into a digital image signal. Then, the image input unit 114 transmits the received image signal to the image processing unit 108. In this case, the external apparatus may only need to be able to output an image signal and may be, for example, a personal computer, a camera, a mobile phone, a smartphone, a hard disk recorder, or a game apparatus.

The communication unit 115 receives a control signal and image data or the like from an external device and includes, for example, a wireless local area network (LAN), a wired LAN, a universal serial bus (USB) interface, and a Bluetooth (registered trademark) interface. A communication method of the communication unit 115 is not particularly limited. Further, if the image input unit 114 uses, for example, an HDMI (registered trademark) terminal as a terminal, the communication unit 115 may perform consumer electronics control (CEC) communication via this terminal. An internal bus 116 is used to transfer various types of data and various commands between the blocks of the liquid crystal display apparatus 100.

Further, the liquid crystal display apparatus 100 may include, other than the blocks illustrated in FIG. 1, a recording medium and a recording/reproduction unit capable of writing and reading image data to and from the recording medium. In this case, the recording/reproduction unit can record image data or the like, which is input from the image input unit 114 or the communication unit 115 in the recording medium. The recording medium may be the one attachable to and detachable from the liquid crystal display apparatus 100 or may be the one built into the liquid crystal display apparatus 100.

Further, the liquid crystal display apparatus 100 may include a display unit and a display control unit. The display control unit can cause the display unit to display an image such as the operation screen for operating the liquid crystal display apparatus 100 or a switch icon. The display unit may be a liquid crystal display, a cathode ray tube (CRT) display, an organic electroluminescence (EL) display, or an LED display, or may cause LEDs to emit light in response to each operation so that a user can recognize a state of the liquid crystal display apparatus 100.

Further, the liquid crystal display apparatus 100 may include an image capture unit including a lens and an actuator for driving the lens. The image capture unit can capture an image of the periphery (e.g., the user) of the liquid crystal display apparatus 100 to obtain image data, and can capture an image projected by the projection optical system 101 (capture an image in the direction of the screen).

The basic operation of projection processing performed by the liquid crystal display apparatus 100 according to the present exemplary embodiment will be described. If the user has given an instruction to turn on the liquid crystal display apparatus 100 using the operation unit 113 or a remote controller (not illustrated), the CPU 110 causes a power supply unit (not illustrated) to supply power to each component of the liquid crystal display apparatus 100 via a power supply circuit (not illustrated).

As the projection processing, the CPU 110 transmits the image data to be displayed to the image processing unit 108. The image processing unit 108 performs necessary processing, such as changing the number of pixels and a frame rate of the image and deforming a shape of the image, on the image data and transmits the processed image data to the liquid crystal control unit 107. The CPU 110 causes the liquid crystal control unit 107 to control transmittances of the liquid crystal panels 103R, 103G, and 103B so as to obtain transmittances according to respective gray-scale levels of the red (R), green (G), and blue (B) color components of the received image data. Then, the CPU 110 causes the light source control unit 109 to control light output from the light source 105.

The light output from the light source 105 is separated into red (R), green (G), and blue (B) components of light by the separation unit 104. The red (R), green (G), and blue (B) components of light are supplied to the liquid crystal panels 103R, 103G, and 103B, respectively. Among the color components of light supplied to the liquid crystal panels 103R, 103G, and 103B, the amount of light according to the transmittance of each pixel of each liquid crystal panel is transmitted through the liquid crystal panel. Then, the red (R), green (G), and blue (B) components of light transmitted through the liquid crystal panels 103R, 103G, and 103B, respectively, are supplied to and combined together by the combination unit 102. Then, the light combined by the combination unit 102 is projected onto the screen (not illustrated) via the projection optical system 101.

The above projection processing is sequentially performed with respect to image data of each frame while the image is being projected. The image to be projected is produced based on image data input from the image input unit 114 or the communication unit 115, image data of the operation screen generated by the image processing unit 108, image data recorded in the recording medium (not illustrated), or image data photographed by the image capture unit.

Next, display modes of the liquid crystal display apparatus 100 according to the present exemplary embodiment will be described. In the present exemplary embodiment, the liquid crystal display apparatus 100 has a normal projection mode and a hanging projection mode. The normal projection mode is a display mode when the liquid crystal display apparatus 100 is used in a state of being placed on a desk or the like. The hanging projection mode is a display mode when the liquid crystal display apparatus 100 is used with the main body of the liquid crystal display apparatus 100 fixed upside down to a ceiling or the like.

Figure 7A:
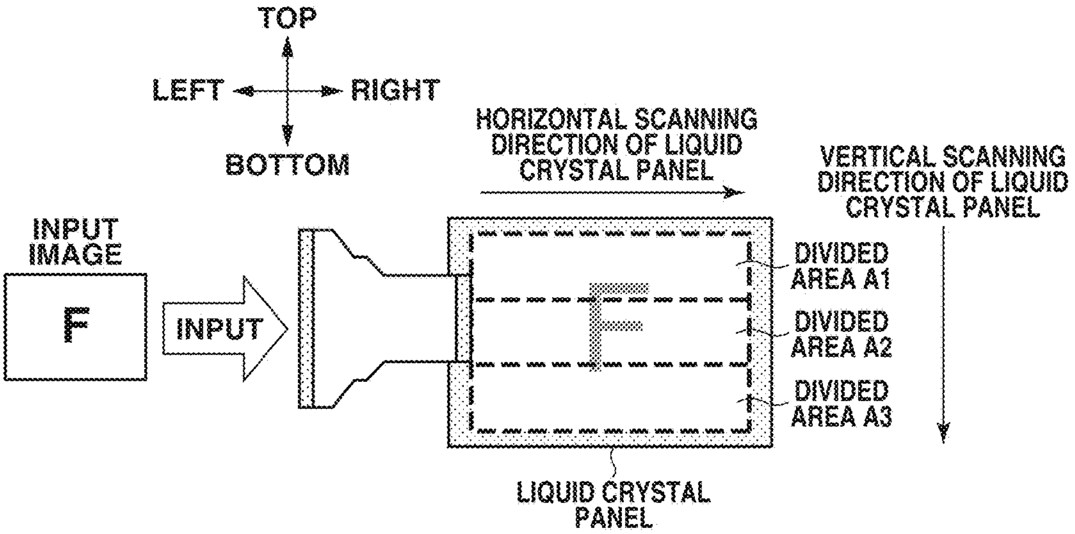
FIGS. 7A and 7B are schematic diagrams illustrating an image to be input to the liquid crystal panel and a scanning direction of the liquid crystal panel in each display mode.

FIG. 7A illustrates an image to be input to the liquid crystal control unit 107 and the scanning direction of the liquid crystal panel 103 in the normal projection mode. In the normal mode, image data is input to the liquid crystal control unit 107 sequentially from the upper left. The liquid crystal control unit 107 scans the liquid crystal panel 103 sequentially from the upper left according to the input image data.

Figure 7B:
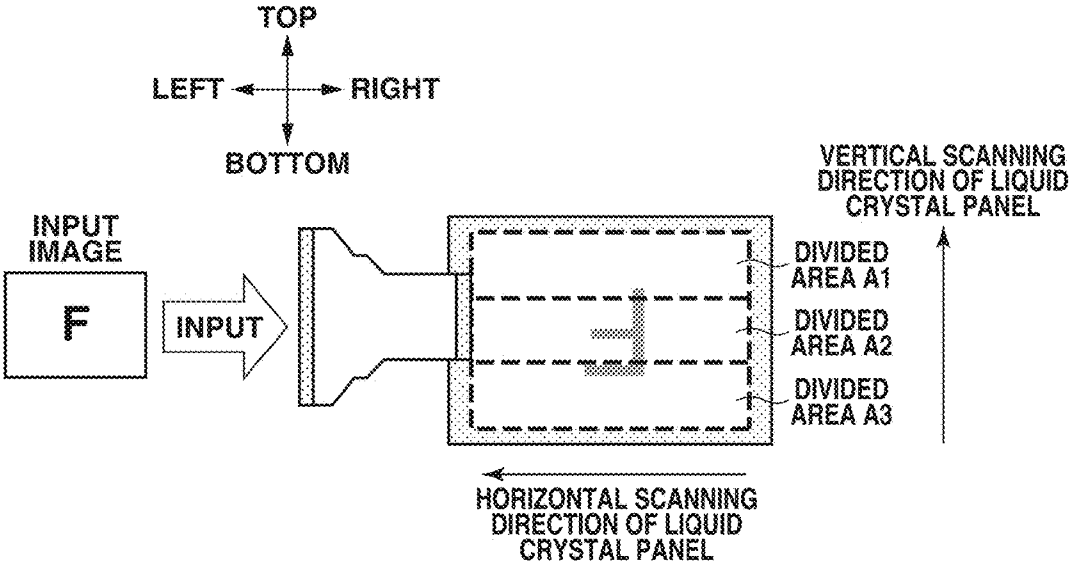

On the other hand, in the hanging projection mode, as illustrated in FIG. 7B, input image data is projected by reversing (rotating 180 degrees) the left, right, top, and bottom of the input image data. In this case, data of the upper left of the input image data corresponds to the lower right of the liquid crystal panel 103. Thus, the liquid crystal control unit 107 scans the liquid crystal panel 103 sequentially from the lower right according to the image data to be input. In the hanging projection mode, there is a method for rotating input image data itself 180 degrees and scanning the liquid crystal panel 103 sequentially from the upper left to the lower right in a similar manner to the normal projection mode. It takes time, however, to perform the processing of generating image data to be input by rotating the image data 180 degrees. This causes a delay by the time when the scanning of the liquid crystal panel 103 is started. Thus, in the present exemplary embodiment, in the hanging projection mode, the liquid crystal control unit 107 controls the scanning order of the liquid crystal panel 103 according to the input image data so that the left, right, top, and bottom of the scanning order are reversed (rotated 180 degrees) from those of the scanning order in the normal mode.

Figure 8A:
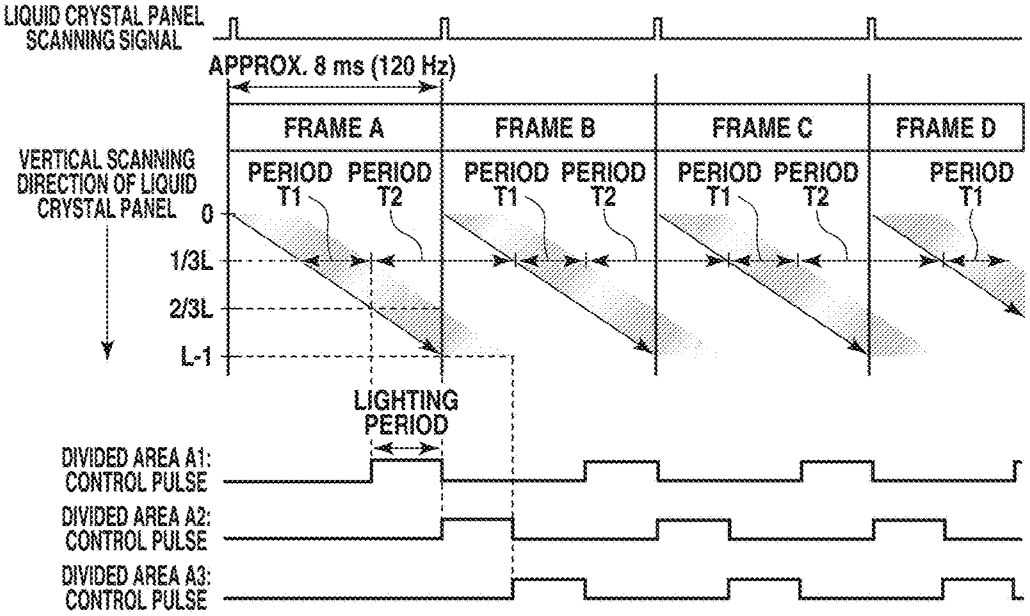
FIGS. 8A and 8B are schematic diagrams illustrating a vertical scanning direction of the liquid crystal panel and lighting control of a light source in each display mode.
Figure 8B:
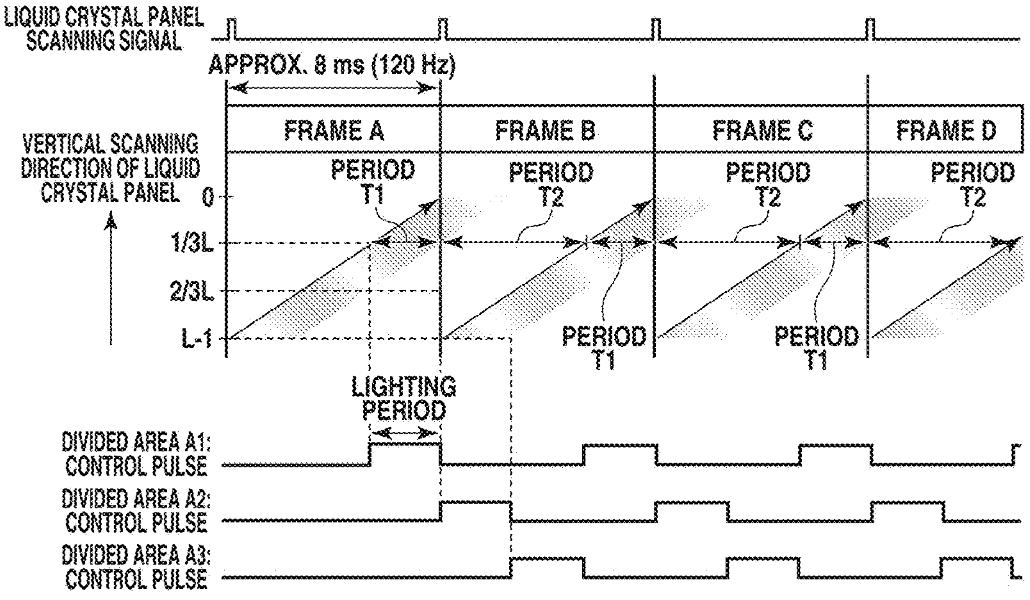

FIGS. 8A and 8B illustrate schematic diagrams of a vertical scanning direction of the liquid crystal panel 103 and lighting control of the light source 105 in the normal projection mode and the hanging projection mode. In the control illustrated in FIGS. 8A and 8B, the lighting control of the light source 105 is similar in the normal projection mode and the hanging projection mode. The liquid crystal panel 103 includes as many liquid crystal devices as L lines in the vertical direction. In the present exemplary embodiment, the liquid crystal panel 103 is divided into three areas in the vertical direction. Then, control is performed so that light from the light source 105 is incident on each area in a predetermined order. The liquid crystal panel 103 is scanned from an upper area (line 0) in the normal projection mode, and is scanned from a lower area (line L−1) in the hanging projection mode. In a period T1, which is illustrated as a gray portion, the proportion of the actual transmittance to the target transmittance, which is determined based on the image data to be displayed, of the liquid crystal panel 103 is less than a predetermined value. In a period T2, which is illustrated as a white portion, the proportion of the actual transmittance to the target transmittance, which is determined based on the image data to be displayed, of the liquid crystal panel 103 is equal to or greater than the predetermined value.

As illustrated in FIG. 7A, the liquid crystal panel 103 is divided into three areas, i.e., an upper area (A1), a middle area (A2), and a lower area (A3) in the vertical direction, and control is performed so that each area is irradiated with light from the light source 105. Further, in FIGS. 8A and 8B, a liquid crystal panel scanning signal is a signal indicating timing of the start of scanning an image of each frame on the liquid crystal panel 103. The liquid crystal control unit 107 starts scanning the liquid crystal panel 103 based on the liquid crystal panel scanning signal. In this case, in the normal projection mode, as illustrated in FIG. 8A, the lighting of the light source 105 is controlled so that light is incident on the divided areas A1, A2, and A3 in this order, starting from the upper area. Further, a lighting period of the light source 105 for each divided area is determined based on the liquid crystal panel scanning signal. Consequently, in the area of the liquid crystal panel 103 corresponding to the divided area irradiated with light, the proportion of the actual transmittance to the target transmittance of the liquid crystal panel 103, which is determined based on the image data to be displayed is equal to or greater than the predetermined value. This can reduce the motion blur.

In the hanging projection mode, however, if control is performed as illustrated in FIG. 8B, the liquid crystal panel 103 is scanned from the lower area, which corresponds to the divided area A3. Thus, if the light source 105 is controlled similarly to the normal projection mode and when light from the light source 105 is being incident on the divided area A1, the upper area of the liquid crystal panel 103, which corresponds to the divided area A1, is in the period T1. At this time, the proportion of the actual transmittance to the target transmittance of the liquid crystal panel 103 has not yet reached the predetermined value.

Figure 2A:
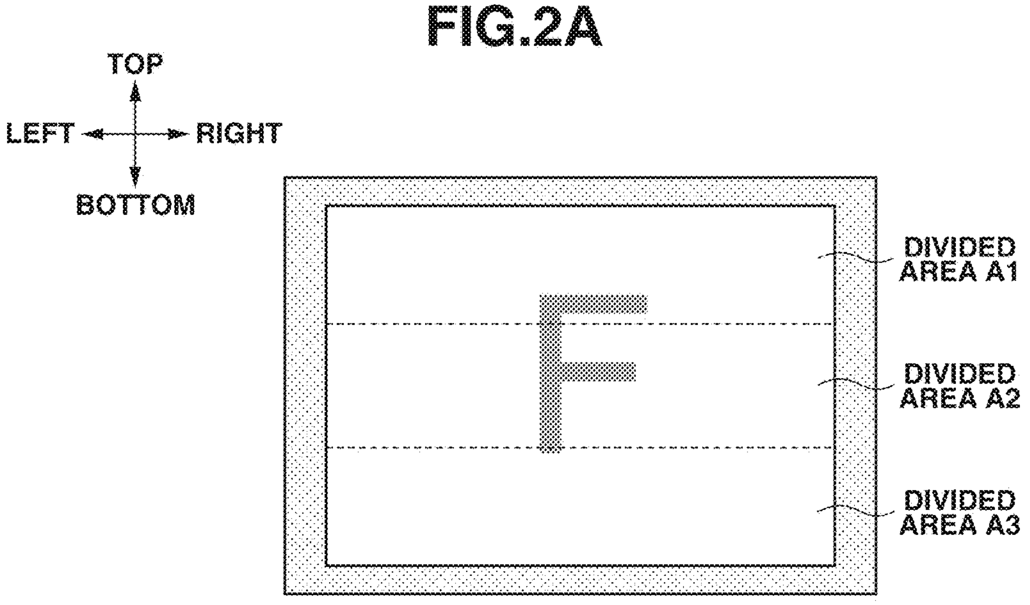
FIGS. 2A and 2B are schematic diagrams of a light source according to a first exemplary embodiment.

FIG. 2A illustrates the divided areas where lighting of the light source 105 is controlled according to the present exemplary embodiment. The light source 105 can be controlled to irradiate each of a plurality of divided areas with light. In the present exemplary embodiment, the liquid crystal panel 103 (which displays an image of "F") is divided into three areas, i.e., an upper area (divided area A1), a middle area (divided area A2), and a lower area (divided area A3), and control is performed so that each area is irradiated with light from the light source 105.

Figure 3A:
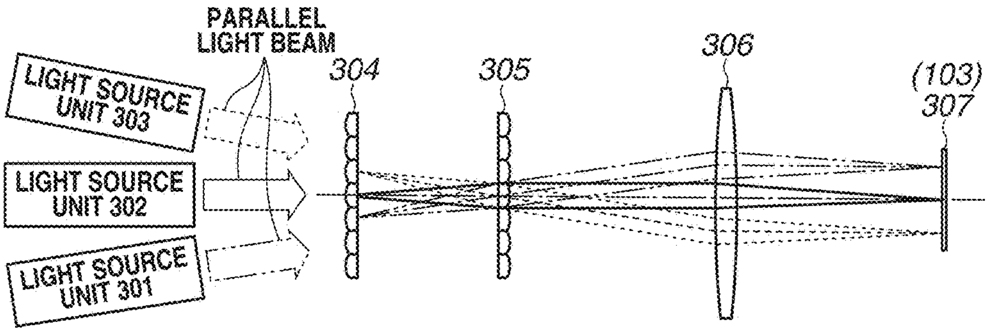
FIGS. 3A and 3B are schematic diagrams illustrating a light source used for performing lighting control for each of a plurality of divided areas.

FIG. 3A is a schematic diagram illustrating the light source 105 for irradiating each of the plurality of areas with light. The light source 105 illustrated in FIG. 3A includes light source units 301 to 303 and lenses 304 to 306. For example, the light source units 301 to 303 are LEDs, the lenses 304 and 305 are fly-eye lenses, and the lens 306 is a condenser lens. Parallel light beams output from the light source units 301 to 303 are transmitted through the lenses 304 to 306, respectively, and thereby can uniformly irradiate the entire area of an irradiation target surface (liquid crystal panel) 307. In the present exemplary embodiment, the separation unit 104 illustrated in FIG. 1 is provided between the lens 306 and the irradiation target surface 307. The light output from the light source units 301 to 303 and transmitted through the lenses 304 to 306 is separated into red (R), green (G), and blue (B) components of light by the separation unit 104. The separated components of light are incident on the liquid crystal panels 103R, 103G, and 103B, respectively.

Figure 3B:
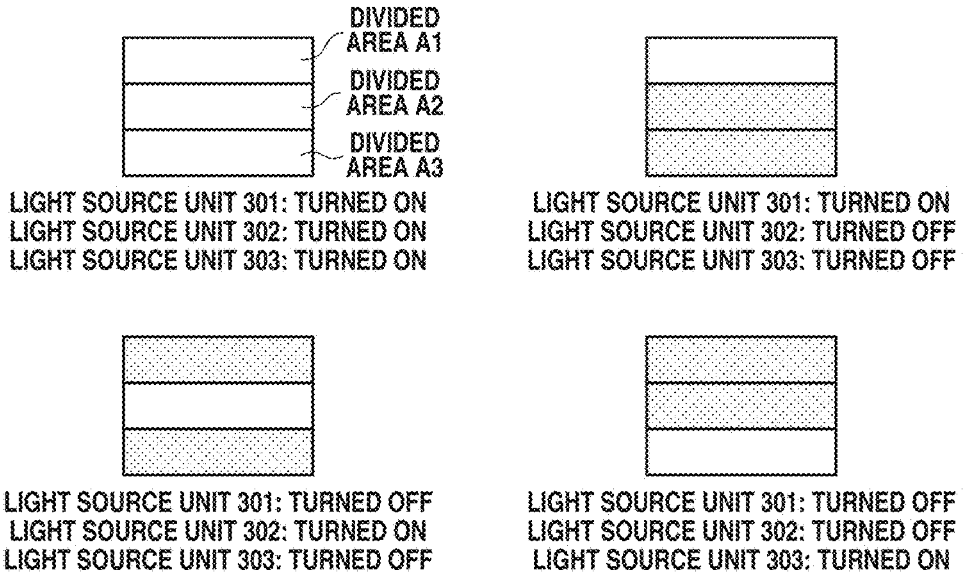

FIG. 3B illustrates relationships among lighting states of the light source units 301 to 303 and lighting states of the divided areas on the liquid crystal panel 103. By using the light source 105 illustrated in FIG. 3A, control is performed so that each of the plurality of areas is irradiated with light as illustrated in FIG. 3B. The light source units 301, 302, and 303 are turned on, thereby irradiating the upper area (the divided area A1), the middle area (the divided area A2), and the lower area (the divided area A3) of the liquid crystal panel 103 with light, respectively.

Figure 4:
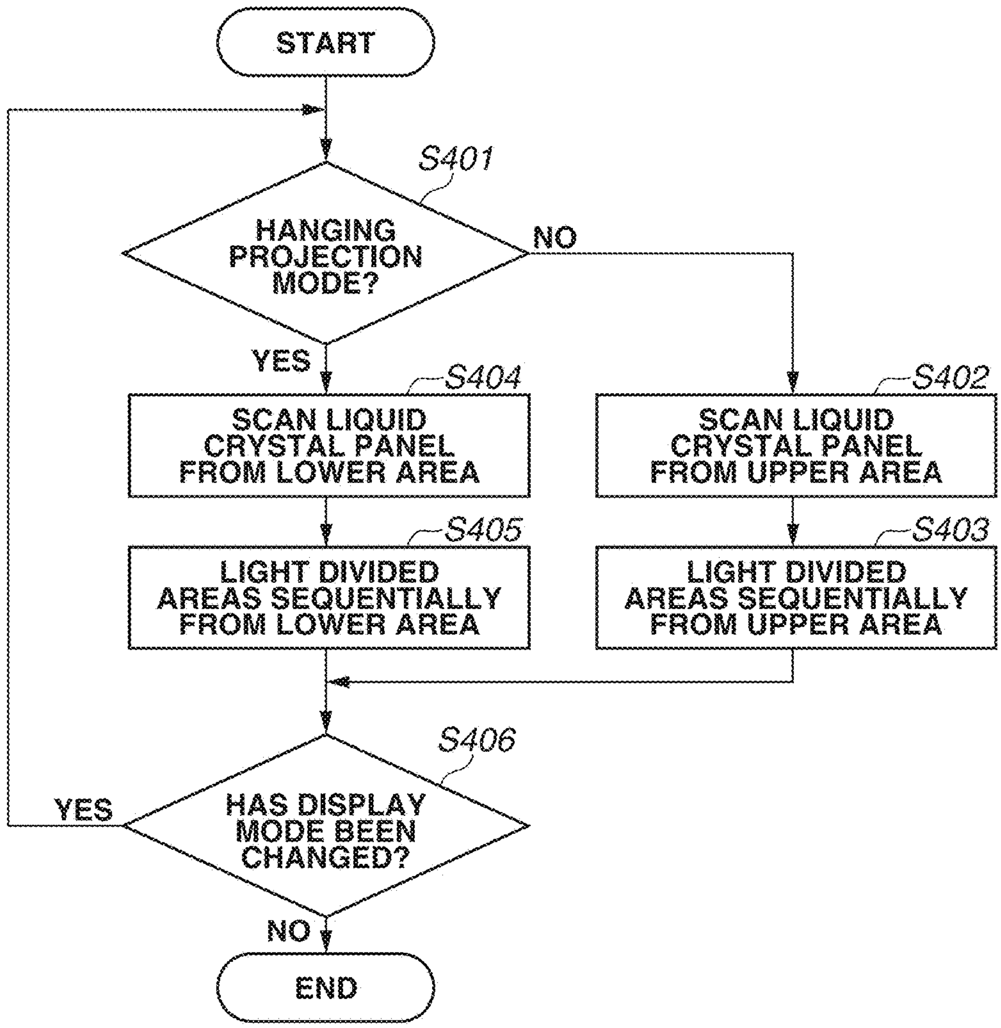
FIG. 4 is a flow chart illustrating control processing performed by switching a display mode.

FIG. 4 is a flow chart illustrating control processing performed by switching the display mode of the liquid crystal display apparatus 100 according to the present exemplary embodiment. The processing in FIG. 4 is performed by the CPU 110 controlling components. The processing in FIG. 4 is started when the liquid crystal display apparatus 100 has been turned on, or when a user has input an instruction regarding a display mode through the operation unit 113.

In step S401, the CPU 110 determines whether the display mode is the hanging projection mode. If the display mode is the normal projection mode (No in step S401), then in step S402, the CPU 110 causes the liquid crystal control unit 107 to perform control so that the liquid crystal panel 103 is scanned from the upper area to the lower area. In the normal projection mode, the liquid crystal control unit 107 scans the liquid crystal panel 103 in the direction from the upper area to the lower area according to input image data. More specifically, scanning of the liquid crystal panel 103 is started from the upper left, and the liquid crystal panel 103 is sequentially scanned such that the horizontal scanning direction is the direction from left to right, and the vertical scanning direction is the direction from top to bottom.

Figure 5A:
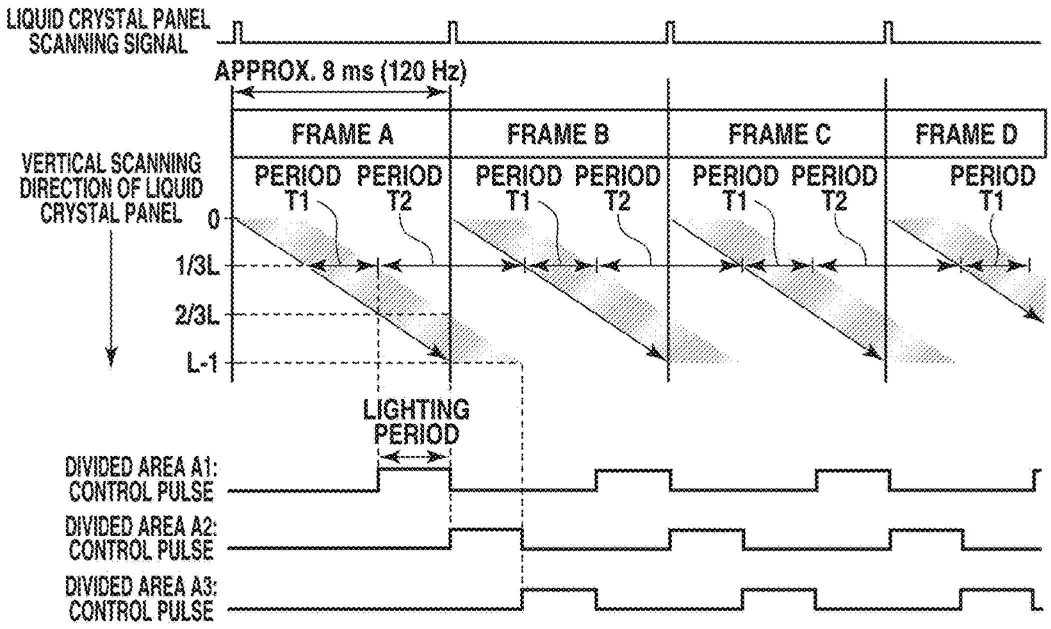
FIGS. 5A and 5B are schematic diagrams illustrating a vertical scanning direction of a liquid crystal panel and lighting control of a light source in each display mode according to the first exemplary embodiment.

FIG. 5A is a schematic diagram illustrating the vertical scanning direction of the liquid crystal panel 103 and lighting control of the light source 105 in the normal projection mode according to the present exemplary embodiment. In the normal projection mode, scanning timing is determined based on a liquid crystal panel scanning signal, and the liquid crystal panel 103 is scanned sequentially from the upper area (line 0). In a period T1, which is illustrated as a gray portion, the proportion of the actual transmittance to the target transmittance of the liquid crystal panel 103, which is determined based on the image data to be displayed, is less than a predetermined value. In a period T2, which is illustrated as a white portion, the proportion of the actual transmittance to the target transmittance of the liquid crystal panel 103, which is determined based on the image data to be displayed is equal to or greater than the predetermined value.

The period illustrated in FIG. 5A in which each divided area is irradiated with light (lighting period) may be a period set in advance or may be a period obtained based on the response characteristics of the liquid crystal panel 103 stored in advance in the ROM 111 or the response characteristics of the liquid crystal panel 103 measured as needed. A control pulse signal in each divided area illustrated in FIG. 5A is set so that a lighting period of each divided area does not overlap lighting periods of the other divided areas. Alternatively, a period may be set in which the plurality of divided areas are simultaneously irradiated with light. The lighting period of each divided area is adjusted so that all the divided areas are irradiated with light in a state where the liquid crystal panel 103 is being driven by a scanning signal based on image data of one frame.

Further, in step S403, the CPU 110 causes the light source control unit 109 to control the lighting of the light source 105 so that the liquid crystal panel 103 is irradiated with light sequentially from the upper area to the lower area. More specifically, the light source control unit 109 controls the lighting of the light source 105 so that the divided areas A1, A2, and A3 are irradiated with light in this order. It is desirable that each divided area should be irradiated with light in a state where, in the portion of the liquid crystal panel 103 corresponding to each divided area, the proportion of the actual transmittance to the target transmittance of the liquid crystal panel 103, which is determined based on the image data, is equal to or greater than the predetermined value. Such control can reduce the motion blur. The light source control unit 109 controls the lighting timing of the light source 105 based on the liquid crystal panel scanning signal so that each divided area is irradiated with light at such desirable timing.

If it is determined in step S401 that the display mode is the hanging projection mode (Yes in step S401), then in step S404, the CPU 110 causes the liquid crystal control unit 107 to perform control so that the liquid crystal panel 103 is scanned from the lower area to the upper area. In the hanging projection mode, the scanning of the liquid crystal panel 103 is controlled so that an image obtained by reversing the left, right, top, and bottom of the image to be projected in the normal projection mode is projected. In other words, the liquid crystal control unit 107 controls driving of the liquid crystal panel 103 according to input image data so that the liquid crystal panel 103 is scanned from the lower right portion. Therefore, as illustrated in FIG. 7B, the horizontal scanning direction of the liquid crystal panel 103 is the direction from right to left, and the vertical scanning direction of the liquid crystal panel 103 is the direction from bottom to top.

Figure 5B:
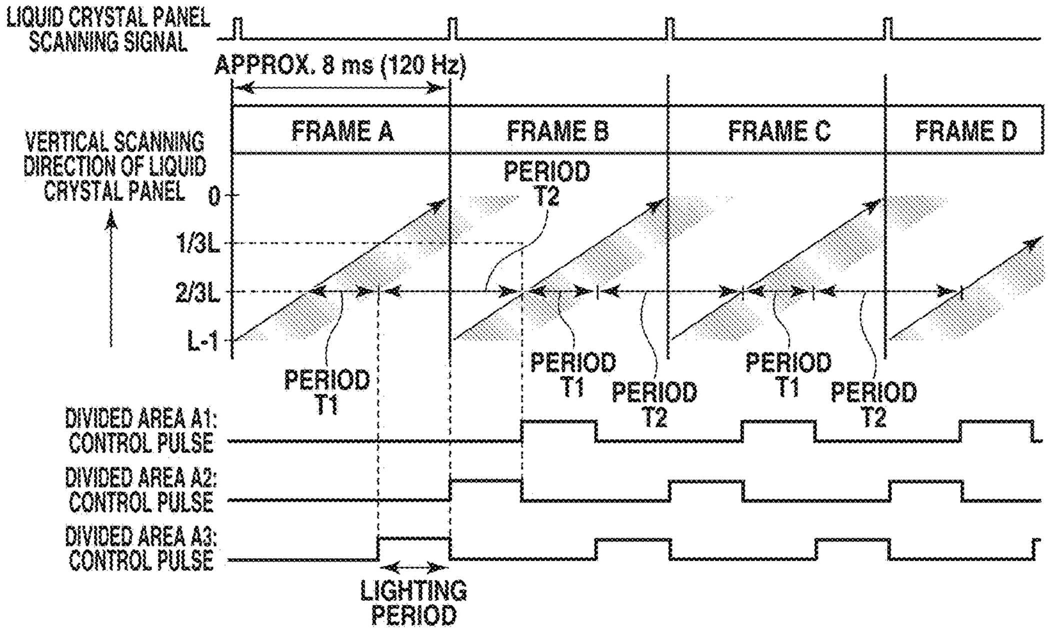

Next, in step S405, the CPU 110 causes the light source control unit 109 to control the order of lighting each area by the light source 105, so that each area is irradiated with light sequentially from the lower area to the upper area. More specifically, the light source control unit 109 controls the lighting of the light source 105 so that the divided areas A3, A2, and A1 are irradiated with light in this order. FIG. 5B illustrates a schematic diagram of the vertical scanning direction of the liquid crystal panel 103 and the lighting control of the light source 105 in the hanging projection mode. In the hanging projection mode, the liquid crystal panel 103 is scanned sequentially from the lower area (line L−1).

In step S406, the CPU 110 determines whether the user has changed the display mode. If the display mode has been changed (Yes in step S406), the processing returns to step S401, and the CPU 110 continues the processing. If the display mode has not been changed (No in step S406), the CPU 110 records settings for controlling the liquid crystal control unit 107 and the light source control unit 109 in the ROM 111, and ends the processing.

If the lighting period in which the light source 105 lights each divided area is set to be shorter than the display period of one frame as in the present exemplary embodiment, brightness of the image to be projected is reduced as compared to the case where the light source 105 always lights all the divided areas. This problem can be solved by controlling the value of a current to be applied to the light source 105, thereby increasing the amount of light of each divided area. Further, the CPU 110 may control the light source control unit 109 to control the lighting of each divided area based on the amount of luminescence of the divided area determined according to the value of image data corresponding to the divided area, and also control the liquid crystal control unit 107 to adjust the image data.

As described above, in a display apparatus having different display modes, even if a scanning direction of a display panel changes, the control of the lighting timing of a light source can reduce the motion blur caused by the response characteristics of the display panel.

Figure 2B:
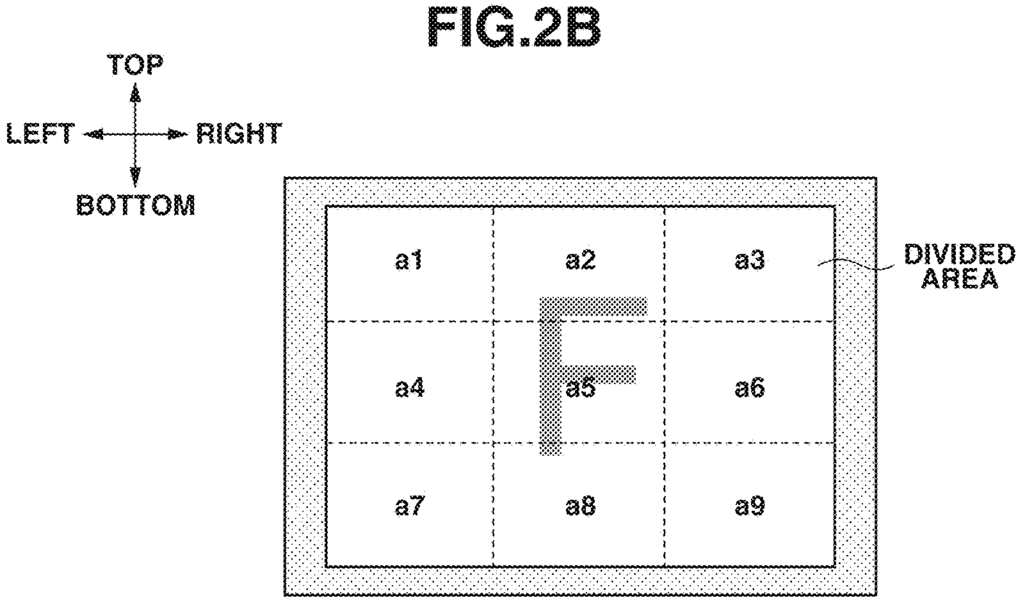

A second exemplary embodiment is different from the first exemplary embodiment in that, as illustrated in FIG. 2B, the lighting of the light source 105 can be controlled in a divided manner based on nine divided areas, i.e., a1 to a9. Further, in the present exemplary embodiment, the liquid crystal display apparatus 100 has a hanging rear-projection mode in addition to the normal projection mode and the hanging projection mode, which have been described in the first exemplary embodiment.

In the present exemplary embodiment, the liquid crystal panel 103 is divided into nine areas in total, i.e., upper right, center, and left areas, middle right, center, and left areas, and lower right, center, and left areas, as viewed in the direction from the light source 105 to the display panel. Then, the lighting of the light source 105 is controlled so that each area is irradiated with light. In the first exemplary embodiment, as illustrated in FIG. 3A, the light source units 301 to 303 of the light source 105 are arranged in a one-dimensional direction (up-down direction). On the other hand, nine light source units are arranged in a two-dimensional manner (up-down and left-right directions) according to the present exemplary embodiment. Then, the liquid crystal display apparatus 100 has three display modes, i.e., the normal projection mode, the hanging projection mode, and the hanging rear-projection mode. Then the liquid crystal display apparatus 100 differentiates a scanning direction of the liquid crystal panel 103 according to a display mode, and changes the order of irradiating the nine divided areas with light according to the scanning direction of the liquid crystal panel 103. The motion blur caused by the transmittance of the liquid crystal panel 103 can be reduced by controlling lighting timing of the light source 105.

Figure 6A:
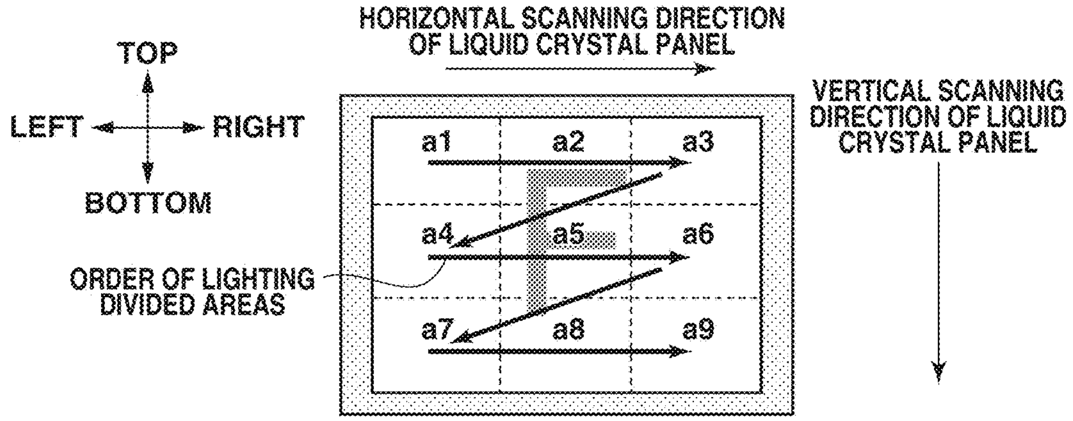
FIGS. 6A, 6B, and 6C are schematic diagrams illustrating a scanning direction of a liquid crystal panel in each display mode according to a second exemplary embodiment.
Figure 6B:
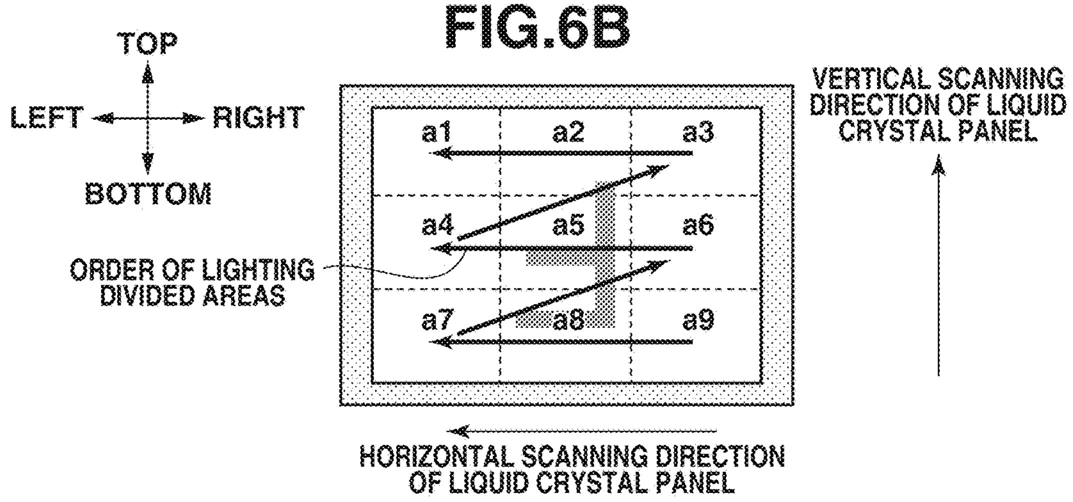
Figure 6C:
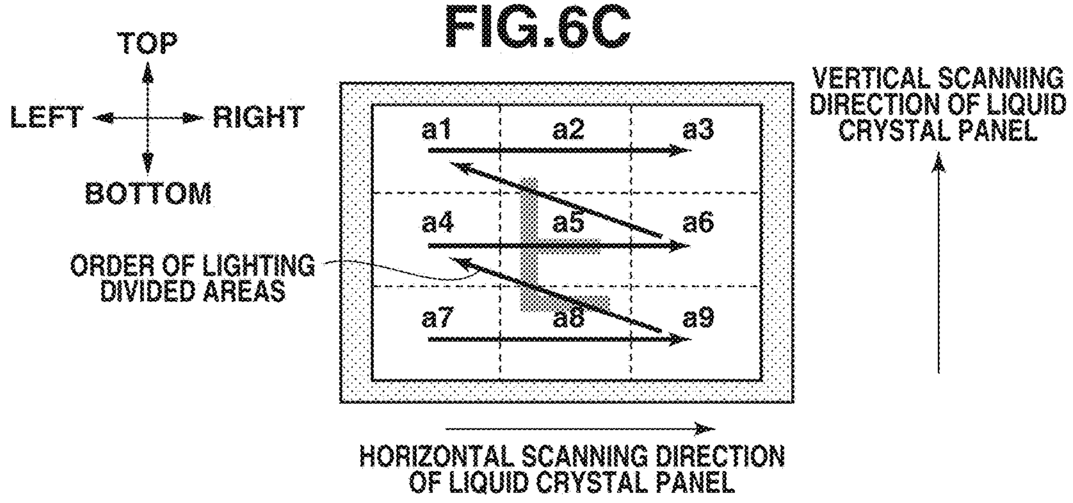

In the hanging rear-projection mode, the liquid crystal display apparatus 100 is used in a state where an image is projected from behind the screen with the main body of the liquid crystal display apparatus 100 fixed upside down to a ceiling or the like. FIGS. 6A, 6B, and 6C are schematic diagrams illustrating the scanning directions of the liquid crystal panel 103 and the divided areas in the normal projection mode, the hanging projection mode, and the hanging rear-projection mode, respectively. An image to be input in each of FIGS. 6A, 6B, and 6C is an image indicating "F" similarly to FIGS. 7A and 7B.

In the normal projection mode in FIG. 6A, scanning of the liquid crystal panel 103 is started from the upper left portion, and the liquid crystal panel 103 is sequentially scanned in such a manner that the horizontal scanning direction is the direction from left to right, and the vertical scanning direction is the direction from top to bottom. In the hanging projection mode in FIG. 6B, the scanning of the liquid crystal panel 103 is started from the lower right portion in such a manner that the horizontal scanning direction is the direction from right to left, and the vertical scanning direction is the direction from bottom to top.

In the hanging rear-projection mode in FIG. 6C, driving of the liquid crystal panel 103 is controlled so that an image obtained by reversing the top and bottom of the image to be projected in the normal projection mode is projected. Then, scanning of the liquid crystal panel 103 is started from the lower left portion. Then, the liquid crystal panel 103 is sequentially scanned in such a manner that the horizontal scanning direction of the liquid crystal panel 103 is the direction from left to right, and the vertical scanning direction of the liquid crystal panel 103 is the direction from bottom to top.

Thus, in the normal projection mode, the light source control unit 109 controls lighting of the light source 105 so that the divided areas a1, a2, a3, a4, a5, a6, a7, a8, and a9 are irradiated with light in this order. Further, in the hanging projection mode, the light source control unit 109 controls lighting of the light source 105 so that the divided areas a9, a8, a7, a6, a5, a4, a3, a2, and a1 are irradiated with light in this order. Further, in the hanging rear-projection mode, the light source control unit 109 controls lighting of the light source 105 so that the divided areas a7, a8, a9, a4, a5, a6, a1, a2, and a3 are irradiated with light in this order.

In the rear-projection mode where an image is projected from behind the screen with the liquid crystal display apparatus 100 placed on a desk or the like, scanning of the liquid crystal panel 103 is controlled so that an image obtained by reversing the left and right of the image is projected. Thus, scanning of the liquid crystal panel 103 is started from the upper right portion of the liquid crystal panel 103, and the liquid crystal panel 103 is sequentially scanned such that the horizontal scanning direction of the liquid crystal panel 103 is the direction from right to left, and the vertical scanning direction of the liquid crystal panel 103 is the direction from top to bottom. Then, the light source control unit 109 controls lighting of the light source 105 so that the divided areas a3, a2, a1, a6, a5, a4, a9, a8, and a7 are irradiated with light in this order in synchronization with the scanning order of the liquid crystal panel 103.

Further, also in a display mode where the liquid crystal display apparatus 100 is used in a state of being rotated 90 degrees, if the liquid crystal control unit 107 has changed the scanning direction of the liquid crystal panel 103, the order of lighting the divided areas where lighting of the light source 105 is controlled by the light source control unit 109 is also changed according to the changed scanning direction. For example, if the liquid crystal display apparatus 100 is used in a state of being rotated 90 degrees to the right, data of the upper left of the image to be displayed corresponds to the lower left of the liquid crystal panel 103. Thus, scanning of the liquid crystal panel 103 is started from the lower left portion, and the liquid crystal panel 103 is scanned from the lower left portion to the upper left portion. More specifically, the liquid crystal panel 103 is sequentially scanned in such a manner that the vertical scanning direction of the liquid crystal panel 103 (the short side direction of the liquid crystal panel 103) is the direction from bottom to top, and the horizontal scanning direction of the liquid crystal panel 103 (the long side direction of the liquid crystal panel 103) is the direction from right to left. In this case, the light source control unit 109 controls lighting of the light source 105 so that the divided areas a7, a4, a1, a8, a5, a2, a9, a6, and a3 are irradiated with light in this order.

As described above, also according to the present exemplary embodiment, in a display apparatus having different display modes, even if the vertical scanning direction or the horizontal scanning direction of a display panel changes, the motion blur caused by the response characteristics of the display panel can be reduced by controlling lighting timing of a light source.

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2013-255673 filed Dec. 11, 2013, which is hereby incorporated by reference herein in its entirety.

What is claimed is:

1. A display apparatus comprising:

a light unit;

a display panel to transmit light from the light unit;

a processor to determine whether a present display mode is a normal projection mode in which an image is displayed in a first direction and the display panel is scanned from top to bottom, or a hanging projection mode in which the image is displayed by reversing the left, right, top, and bottom of the image in the normal projection mode and the display panel is scanned from bottom to top; and a driving unit to drive the display panel according to a scanning signal synchronized with display timing of an image, wherein the processor determines timing of lighting by the light unit so as to light an area after a transmittance of the area of a plurality of areas reaches a predetermined transmittance for each of the plurality of areas of the display panel, and according to the present display mode, control the light unit to light an area selected among the plurality of areas of the display panel and not to light the areas other than the selected area, and wherein, in the normal projection mode, the processor controls the light unit to light the plurality of areas from an upper area of the plurality of areas after the scanning signal, and in the hanging projection mode, the processor controls the light unit to light the plurality of areas from a lower area of the plurality of areas after the scanning signal.

2. The display apparatus according to claim 1, further comprising a hanging rear-projection mode, wherein the hanging rear-projection mode is for displaying an image obtained by reversing the top and the bottom of the image to be displayed in the normal projection mode without reversing the left and the right of the image to be displayed in the normal projection mode.

3. The display apparatus according to claim 1, wherein the processor controls the light unit to light each area during a period shorter than a display period of an image of one frame.

4. The display apparatus according to claim 1, further comprising a projection unit configured to project light transmitted through the display panel onto a projection plane.

5. A method for controlling a display apparatus including a light unit and a display panel to transmit light from the light unit, the method comprising:

determining whether a present display mode is a normal projection mode in which an image is displayed in a first direction and the display panel is scanned from top to bottom, or a hanging projection mode in which the image is displayed by reversing the left, right, top, and bottom of the image in the normal projection mode and the display panel is scanned from bottom to top; and driving the display panel according to a scanning signal synchronized with display timing of an image; and determining timing of lighting by the light unit so as to light an area after a transmittance of the area of a plurality of areas reaches a predetermined transmittance for each of the plurality of areas of the display panel, and according to the present display mode, control the light unit to light an area selected among the plurality of areas of the display panel and not to light the areas other than the selected area, wherein, in the normal projection mode, controlling the light unit to light the plurality of areas from an upper area of the plurality of areas after the scanning signal, and in the hanging projection mode, controlling the light unit to light the plurality of areas from a lower area of the plurality of areas after the scanning signal.

* * * * *